US006823786B1

(12) United States Patent
Shmaiser et al.

(10) Patent No.: US 6,823,786 B1
(45) Date of Patent: Nov. 30, 2004

(54) TANDEM PRINTING SYSTEM WITH FINE PAPER-POSITION CORRECTION

(75) Inventors: Aron Shmaiser, Rishon-Lezion (IL); Daniel Sagi, Nes-Ziona (IL); Lior Lewintz, Pardes-Hana (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 10/089,631

(22) PCT Filed: Nov. 7, 1999

(86) PCT No.: PCT/IL99/00600

§ 371 (c)(1), (2), (4) Date: Aug. 5, 2002

(87) PCT Pub. No.: WO01/34397

PCT Pub. Date: May 17, 2001

(51) Int. Cl.$^{7}$ .......................... B41F 5/02; B41F 13/24; B41F 5/00; B41J 11/50; G06F 15/00

(52) U.S. Cl. ...................... 101/231; 101/232; 101/216; 101/217; 101/233; 400/605; 358/1.9

(58) Field of Search ............................... 101/231, 232, 101/216, 116, 118, 217, 233, 183, 181; 358/1.9, 501; 400/605, 607; 399/16

(56) References Cited

U.S. PATENT DOCUMENTS 3,734,015 A 5/1973 Camis et al. ............... 101/229
3,741,643 A 6/1973 Vermeulen et al. ......... 399/249
3,777,158 A 12/1973 Kamogawa et al. ........ 250/324

(List continued on next page.)

FOREIGN PATENT DOCUMENTS

| | | |
|---|---|---|
| DE | 196 35 388 | 3/1998 |
| EP | 0 274 989 | 7/1988 |
| EP | 0 311 924 | 4/1989 |
| EP | 0 312 660 | 4/1989 |
| EP | 0 342 704 | 11/1989 |
| EP | 0 435 164 | 7/1991 |

(List continued on next page.)

OTHER PUBLICATIONS

Canon Inc.: JP 53–010441 A; Jan. 30, 1978 & Patent Abstracts of Japan; vol. 002; No. 045 (E–024); Mar. 22, 1978.

Fuji Photo Film Co. Ltd.; JP 63–094287 A; Apr. 25, 1988 & Patent Abstracts of Japan; vol. 012; No. 331 (P–755); Sep. 7, 1988.

Hitachi Koki Co. Ltd.; JP 03–179470 A; Aug. 5, 1991 & Patent Abstracts of Japan; vol. 015; No. 433 (P–1271); Nov. 5, 1991.

*Primary Examiner*—Andrew H. Hirshfeld
*Assistant Examiner*—Wasseem H. Hamdan
(74) *Attorney, Agent, or Firm*—Fenster & Company

(57) ABSTRACT

A tandem printer with a mechanism for fine substrate-position correction, comprising: a first printing station; a second printing station; a rotatable element, rotating at a given rotation rate, that receives the substrate after printing thereon by the first printing station and transfer the substrate toward the second printing station; a sensor which measure the position of an edge of the substrate during its transfer from the first printing station to the second printing station; and a controller, which applies a corrective step change in angular position of the rotatable element responsive to the measurements of the sensor, without changing the general rotation rate of the rotatable element.

27 Claims, 2 Drawing Sheets

U.S. PATENT DOCUMENTS

| | | | | | |
|---|---|---|---|---|---|
| 4,165,689 | A | | 8/1979 | Giuiuzza | 101/230 |
| 4,186,662 | A | | 2/1980 | Borneman | 101/218 |
| 4,198,642 | A | | 4/1980 | Gamblin | 347/41 |
| 4,202,268 | A | | 5/1980 | Becker | 101/409 |
| 4,204,471 | A | | 5/1980 | Becker | 101/410 |
| 4,204,472 | A | | 5/1980 | Borneman | 101/230 |
| 4,240,346 | A | | 12/1980 | Landis et al. | 101/139 |
| 4,375,326 | A | | 3/1983 | Lang | 399/401 |
| 4,378,734 | A | | 4/1983 | Wirz | 101/230 |
| 4,410,897 | A | | 10/1983 | Moriguchi et al. | 347/173 |
| 4,428,667 | A | | 1/1984 | Phelps et al. | 399/372 |
| 4,431,303 | A | | 2/1984 | Hoffman | 399/401 |
| 4,568,169 | A | | 2/1986 | Wada et al. | 399/401 |
| 4,607,940 | A | | 8/1986 | Quang | 399/88 |
| 4,621,576 | A | | 11/1986 | Wirz | 101/230 |
| 4,639,126 | A | | 1/1987 | Bushaw et al. | 399/364 |
| 4,684,238 | A | | 8/1987 | Till et al. | 399/308 |
| 4,721,041 | A | | 1/1988 | Simeth | 101/230 |
| 4,723,489 | A | | 2/1988 | Emrich et al. | 101/230 |
| 4,745,282 | A | | 5/1988 | Tagawa et al. | 250/326 |
| 4,791,869 | A | * | 12/1988 | Furukawa | 101/232 |
| 4,806,079 | A | | 2/1989 | Kuhn | 417/343 |
| 4,814,822 | A | | 3/1989 | Acquaviva et al. | 399/204 |
| 4,821,643 | A | | 4/1989 | Wieland | 101/230 |
| 4,884,794 | A | | 12/1989 | Dinatale et al. | 271/3.19 |
| 4,949,949 | A | | 8/1990 | Holmes et al. | 271/3.03 |
| 4,967,660 | A | | 11/1990 | Yamanari et al. | 101/229 |
| 4,974,027 | A | | 11/1990 | Landa et al. | 399/249 |
| 5,003,355 | A | | 3/1991 | Tanzawa | 399/401 |
| 5,020,788 | A | | 6/1991 | Hatano et al. | 271/126 |
| 5,110,159 | A | | 5/1992 | Herold et al. | 285/121.5 |
| 5,170,211 | A | | 12/1992 | Haupt et al. | 399/93 |
| 5,385,091 | A | * | 1/1995 | Cuir et al. | 101/217 |
| 5,439,029 | A | | 8/1995 | Becker | 137/580 |
| 5,552,875 | A | | 9/1996 | Sagiv et al. | 399/364 |
| 5,606,913 | A | * | 3/1997 | Kowalewski | 101/183 |
| 5,615,609 | A | * | 4/1997 | Hill et al. | 101/183 |
| 5,710,964 | A | | 1/1998 | Tombs et al. | 399/303 |
| 5,752,776 | A | | 5/1998 | Kunreuther | 400/82 |
| 5,772,343 | A | | 6/1998 | Beretta et al. | 400/624 |
| 5,802,424 | A | | 9/1998 | Pernesky et al. | 399/92 |
| 5,837,408 | A | | 11/1998 | Parker | 430/42 |
| 5,961,228 | A | | 10/1999 | Ward et al. | 400/120.16 |
| 5,963,770 | A | * | 10/1999 | Eakin | 399/364 |
| 6,059,705 | A | * | 5/2000 | Ruthenberg et al. | 493/11 |
| 6,072,966 | A | | 6/2000 | Matsuo | 399/91 |
| 6,088,565 | A | * | 7/2000 | Jia et al. | 399/302 |
| 6,122,468 | A | * | 9/2000 | Sakamoto et al. | 399/223 |
| 6,144,836 | A | * | 11/2000 | Umeda et al. | 399/400 |
| 6,219,516 | B1 | * | 4/2001 | Furst et al. | 399/301 |
| 6,271,937 | B1 | * | 8/2001 | Zuber | 358/1.9 |
| 6,382,092 | B1 | * | 5/2002 | Van Den Brink et al. | 101/116 |
| 6,412,409 | B2 | | 7/2002 | Weishew | 101/216 |
| 6,418,847 | B1 | * | 7/2002 | Holecek | 101/232 |

FOREIGN PATENT DOCUMENTS

| | | |
|---|---|---|
| EP | 0 562 269 | 9/1993 |
| EP | 0 570 786 | 11/1993 |
| EP | 0 615 941 | 9/1994 |
| EP | 0 616 886 | 9/1994 |
| EP | 0 161 522 | 11/1995 |
| EP | 0 813 971 | 12/1997 |
| EP | 0 861 722 | 9/1998 |
| EP | 0 878 311 | 11/1998 |
| FR | 2 358 273 | 2/1978 |
| WO | WO 90/04216 | 4/1990 |
| WO | WO 93/01531 | 1/1993 |
| WO | WO 93/04409 | 3/1993 |
| WO | WO 94/23347 | 10/1994 |
| WO | WO 95/10801 | 4/1995 |
| WO | WO 96/17277 | 6/1996 |
| WO | WO 97/07433 | 2/1997 |
| WO | WO 99/61958 | 12/1999 |
| WO | WO 01/02910 | 1/2001 |
| WO | WO 01/53895 | 7/2001 |

* cited by examiner

TANDEM PRINTING SYSTEM WITH FINE PAPER-POSITION CORRECTION

RELATED APPLICATIONS

The present application is a U.S. national application of PCT/IL99/00600, filed 7 Nov. 1999.

FIELD OF THE INVENTION

The present invention relates generally to printing systems and more particularly to tandem printing systems for printing variable information using two or more printing stations and including a paper-position correction mechanism.

BACKGROUND OF THE INVENTION

Tandem printing systems, that is printing systems with two or more printing engines, are well known, both for duplex printing and for multi-colour, single-side printing, with each colour being printed with a different one of a tandem series of printing engines. Such systems are known both for conventional and electronic printing. However, such systems depend on a very accurate transmission and edge alignment of the paper.

In systems of rollers and belts, a mismatch in transmission and edge alignment may occur for various reasons. The rollers may be slightly off centre, the paper may slip or creep off is its hold, there may be diameter variations, for example, because of different paper thickness and the belts may stretch as a result of heat or age. To achieve the accuracy required in tandem printing, these misalignments must be corrected.

SUMMARY OF THE INVENTION

One aspect of some preferred embodiments of the invention relates to a tandem printer with a mechanism for fine paper-position correction.

Preferably, the tandem printer has a motive system comprising a rotatable element which rotates at a given rotation rate and on which the paper is mounted, wherein a step angular displacement to the rotatable element brings the paper into alignment, without changing the rotation rate of the rotatable element.

Preferably, a paper sensor measures the position of the paper. The measurements are reported to a controller which applies the step, angular displacement to the rotatable element, in addition to the continuous rotation, responsive to the measurements of the sensor.

Preferably, the motive system also comprises a flexible strip, for example, a timing belt, which transfers motion at a constant rotation rate from a driving roller to the rotatable element, wherein a step displacement to the flexible strip induces the step angular displacement to the rotatable element. The axis of the flexible strip is defined as the line connecting the centre of the rotatable element and the driving roller.

Preferably, the step displacement of the flexible strip is provided by linear motion of two pulleys located upstream and downstream of the rotatable element, wherein as one pulley presses onto the flexible strip, requiring slack, the other pulley pulls away from the flexible strip, releasing slack. The transfer of flexible-strip slack from one pulley to the other provides the step displacement of the flexible strip.

Preferably, the tandem printer comprises means for providing the required linear motion to the pulleys.

In some preferred embodiments of the invention, means for providing linear motion to the pulleys comprises a rod having two edges on which the two pulleys are mounted. The rod is preferably situated perpendicular to the axis of the flexible strip, with one pulley, at one edge, pressing against the flexible strip upstream of the rotatable element, at a first point, and the other pulley, at the other edge, pressing against the flexible strip downstream of the rotatable element, at a second point. Movement of the rod up and down in a direction generally, perpendicular to the axis of the flexible strip provides the required linear motion to the pulleys.

Alternatively, means for providing linear motion to the pulleys comprises a shaft on which one pulley is mounted, pressing against the flexible strip at a first point and a spring-loaded device (for example, a spring-loaded piston-cylinder device) on which the other pulley is mounted, in partial compression, pressing against the flexible strip at a second point, wherein the first and second points are upstream and downstream of the rotatable element, in any order, reasonably far from any rotating elements associated with the flexible strip. Linear movement of the shaft provides the linear motion to the pulley mounted on it. The response of the spring-loaded device to the release or demand in slack provides the motion of the other pulley.

Preferably, a stepper motor provides the motion for the pulleys. In some preferred embodiments an eccentric shaft is used to convert the motor motion to linear motion. Alternatively, any of a slider-crank mechanism, a piston-cylinder mechanism, or a turning-screw mechanism may be used. Alternatively still, any other method of providing linear motion, known to persons versed in kinematics, may be used.

Preferably, the motor is activated by a controller which determines when the paper is out of alignment and the magnitude and direction of the misalignment.

In some preferred embodiments, the section of the flexible strip adjacent to the first point and the section of the flexible strip adjacent to the second point are parallel. For small displacements, the step angular displacement of the rotatable element is symmetric for upward and downward linear displacements of the pulleys.

Preferably, the step angular displacement of the rotatable element is given as a function (which may be empirical) of the linear displacement of the pulleys. Alternatively, a lookup table is used.

In some preferred embodiments of the invention, the tandem printer comprises a duplex printer for printing on both sides of paper while inverting it. Alternatively, the tandem printer comprises a multicolour printer of single side printing, with each colour being printed with a different one of the tandem series of printing engines.

In some preferred embodiments of the invention, the tandem printer comprises any conventional printer, such as a printer which prints directly from plates. Alternatively, the tandem printer comprises any of a lithographic printer, an electrostatic printer, or an electronic printer.

There is thus provided, in accordance with a preferred embodiment of the invention a tandem printer with a mechanism for fine substrate-position correction, comprising:

a first printing station;

a second printing station;

a rotatable element, rotating at a given rotation rate, that receives the substrate after printing thereon by the first printing station and transfers the substrate toward the second printing station;

a sensor which measures the position of an edge of the substrate during its transfer from the first printing station to the second printing station; and a controller, which applies a corrective step change in angular position of the rotatable element responsive to the measurements of the sensor, without changing the general rotation rate of the rotatable element.

Preferably, the sensor which measures the position of an edge of the substrate is situated on the rotatable element.

Alternatively, the sensor which measures the position of an edge of the substrate is adjacent to the rotatable element.

In a preferred embodiment of the invention, the tandem printer also comprises:

a transfer system which transfers the substrate from the first printing station to the second printing station, in which the rotatable element is comprised;

the transfer system further comprising:

a flexible strip, travelling at a given rate and providing motion to the rotatable element, wherein a corrective step displacement of the flexible strip induces the corrective step change in angular position of the rotatable element.

Preferably, the flexible strip rotates at a constant rate.

Preferably, the flexible strip is a timing belt.

In a preferred embodiment of the invention, the tandem printer also comprises at least one pulley that provides the corrective step displacement of the flexible strip.

In a preferred embodiment of the invention, the at least one pulley comprises:

two pulleys, situated along the flexible strip, one upstream and one downstream of the rotatable element, said pulleys pressing into the flexible strip at a first point and a second point, respectively, wherein when pressure of one pulley is partially released, the other pulley takes up the thus produced slack, providing the corrective step displacement of the flexible strip.

In a preferred embodiment of the invention, the tandem printer also comprises a rod, comprising two points, to which the two pulleys are attached, one at each edge, wherein linear movement of the rod provides the motion of the pulleys into and away from the flexible strip.

Preferably, the tandem printer also includes a motion provider for the rod, comprising:

an eccentric shaft to which the rod is attached; and a motor which provides motion to the eccentric shaft, wherein the motor is activated by the controller.

Alternatively, the tandem printer includes a motion provider for the rod, comprising:

a slider-crank mechanism, wherein the rod is attached to the slider and moves in the same direction as the slider; and a motor which provides motion to the slider-crank mechanism, wherein the motor is activated by the controller.

Alternatively, the tandem printer includes a motion provider for the rod, comprising:

a piston-cylinder mechanism, wherein the rod is attached to the piston and moves in the same direction as the piston; and a motor which provides motion to the piston-cylinder mechanism, wherein the motor is activated by the controller.

Alternatively still, the tandem printer includes a motion provider for the rod, comprising:

a turning-screw mechanism, wherein the rod is attached to the screw and moves in the same direction as the screw; and a motor which provides motion to the turning-screw mechanism, wherein the motor is activated by the controller.

Preferably, the motor is a stepper motor.

In another preferred embodiment of the invention, the tandem printer also comprises:

a shaft on which one of the two pulleys is mounted, pressing against the flexible strip at a first point; and a resilient device on which the other pulley is mounted, resiliently pressing against the flexible strip at a second point, wherein linear movement of the shaft provides motion of the pulley at the first point, and the response of the resilient device to release or demand in slack provides motion of the pulley at the second point.

Preferably, the shaft is an eccentric shaft and including:

a motor which provides motion to the eccentric shaft, wherein the motor is activated by the controller.

Preferably, the tandem printer also includes a motion provider for the shaft, comprising:

a slider-crank mechanism, wherein the shaft is connected to the slider and moves in the same direction as the slider, and a motor which provides motion to the slider-crank mechanism, wherein the motor is activated by the controller.

Alternatively, the tandem printer also includes a motion provider for the shaft, comprising:

a piston-cylinder mechanism, wherein the shaft is connected to the piston and moves in the same direction as the piston; and a motor which provides motion to the piston-cylinder mechanism, wherein the motor is activated by the controller.

Alternatively still, the tandem printer also includes a motion provider for the shaft, comprising:

a turning-screw mechanism, wherein the shaft is connected to the screw and moves in the same direction as the screw; and a motor which provides motion to the turning-screw mechanism, wherein the motor is activated by the controller.

Preferably, the motor is a stepper motor.

In a preferred embodiment of the invention, the two pulleys are substantially identical.

In a preferred embodiment of the invention, the section of the flexible strip adjacent to the first point and a section of the flexible strip adjacent to the second point are parallel to each other.

In a preferred embodiment of the invention, the tandem printer comprises a duplex printer for printing on both sides of the paper while inverting it.

Alternatively, the tandem printer comprises a multicolour printer of single-side printing, with each colour being printed with a different one of the tandem series of printing engines.

In a preferred embodiment of the invention, the tandem printer is a conventional printer which uses plates.

Alternatively, the tandem printer is an electrostatic printer.

Alternatively, the tandem printer is an electronic printer.

Alternatively, the tandem printer is a lithographic printer.

In a preferred embodiment of the invention, a multi-engine printer with a mechanism for fine substrate-position correction, is provided, comprising at least 3 printing engines, wherein each adjacent pair of printing engines comprises a first printing station and a second printing station, of the tandem printer described herein.

There is further provided, in accordance with a preferred embodiment of the invention a tandem printing method while applying a fine positional correction to a substrate, comprising:

printing on a substrate by a first printing station;

transferring the substrate from the first printing station toward a second printing station, comprising:

mounting the substrate on a rotatable element of a substrate-transfer system; and moving the substrate by rotating the rotatable element at a given rotation rate;

measuring the angular position of an edge of the substrate on the rotatable element; and applying a step angular displacement to the rotatable element, responsive to the measurement, without changing the rotation rate of the rotatable element.

Preferably, rotating the rotatable element at a given rotation rate comprises rotating the rotatable element by a flexible strip; and applying the step angular displacement to the rotatable element comprises applying a step displacement to the flexible strip.

Preferably, applying the step displacement to the flexible strip comprises any of a positive and negative step displacements to the flexible strip, thus inducing any of a clockwise and a counterclockwise step angular displacements to the rotatable element.

Preferably, applying the positive step displacement to the flexible strip comprises:

releasing flexible strip slack upstream of the rotatable element; and taking up flexible strip slack downstream of the rotatable element; and applying the negative step displacement to the flexible strip comprises:

releasing flexible strip slack downstream of the rotatable element; and taking up flexible strip slack upstream of the rotatable element.

Preferably, the method also includes using a lookup table to calculate a necessary step displacement of the flexible strip in order to achieve a desired step angular displacement of the rotatable element

BRIEF DESCRIPTION OF THE DRAWINGS

The present invention will be more clearly understood from the following detailed description of the preferred embodiments of the invention and from the attached drawings, in which same number designations are maintained throughout the figures for each element and in which.

DETAILED DESCRIPTION OF PREFERRED EMBODIMENTS

Figure 1:
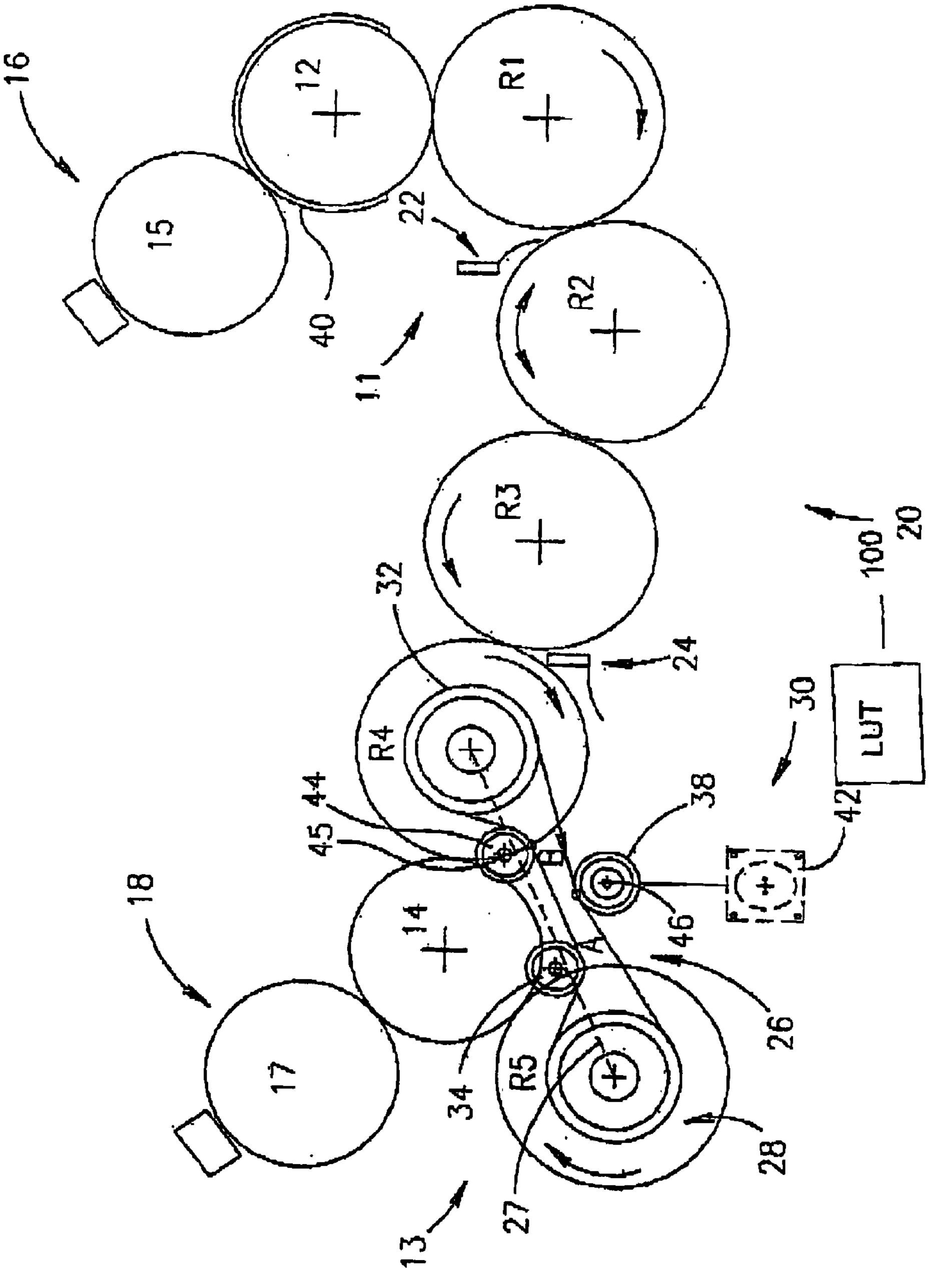
FIG. 1 is a schematic illustration of a tandem printer comprising a correctional mechanism for correcting a paper position, in accordance with a preferred embodiment of the invention.

Reference is now made to FIG. 1 which is a schematic illustration of a tandem printer 10 having a roller assembly 20 for paper inversion and transfer and a correctional mechanism 30, in accordance with a preferred embodiment of the invention.

Preferably, tandem printer 10 comprises a first printing station 11, comprising an impression roller 12 and at least one first printing engine 16 associated with it, and a second printing station 13, comprising an impression roller 14 and at least one second printing engine 18 associated with it. In the system shown, each of printing engines 16 and 18 comprises an intermediate transfer member (ITM) 15 and 17 respectively. The image is transferred to ITM or 17 and then to paper 40 on the respective impression roller. Alternatively, no ITM is used, and each of printing engine 16 and 18 comprises a photoconductive drum 15 or 17 respectively. The image is preferably formed on photoconductive drum 15 or 17 and transferred to paper 40 on the impression roller. For two side printing, one side of a paper 40 is printed while it is on impression roller 12, by first printing engine 16, and an opposite side of paper 40 is printed while it is on impression roller 14, by second printing engine 18. For multicolour, single side printing, each colour is printed with a different one of the tandem series of printing engines, such as printing engines 16 and 18.

In a preferred embodiment of the invention, roller assembly 20 inverts the paper and transfers it from impression roller 12 to impression roller 14. In a preferred embodiment of the invention, the "rollers" of roller assembly 20 are rotary arms, rather than rollers, each with vacuum nipples that attach themselves to the paper. Generally, the nipples are evenly distributed along the length of the paper and extend through the width of it. The paper pick-off system, which removes the paper from one roller and transfers it to the other, comprises a vacuum pick-off system, as one set of nipples lets go and the other takes over. The rotary-arm "rollers" and the vacuum nipples and vacuum paper pick-off system associated with them are described in PCT patent application, PCT/IL98/00553, "Printing System" filed on Nov. 11, 1998, in the Israel receiving office, whose disclosure is incorporated herein by reference. Alternatively, conventional rollers may be used. The exact configuration of the paper transfer and (or) inversion system may differ from that shown, since the inversion is applicable to many transfer/inversion and perfecta or perfecta-like systems known in the art.

Typically, after the first image (which may be coloured or black and white) is transferred onto the first side of paper 40, paper 40 is transferred from impression roller 12 to a roller R1 of assembly 20. From roller R1, which rotates in a clockwise direction, paper 40 is transferred to a perfecting roller R2, which, during the transfer from roller R1 to roller R2, rotates in the counterclockwise direction.

Preferably, perfecting roller R2 is controlled by a servo motor (not shown) capable of moving at different angular velocities, clockwise and counterclockwise. Preferably, the purpose of perfecting roller R2 is to invert the paper. Additionally, perfecting roller R2 corrects the position of paper 40 for the following reason: Impression rollers 12 and 14 are each controlled by a separate engine and slight errors are introduced by a system that controls their relative rotation. Perfecting roller R2 corrects for slight variations in angular velocities and in phases, responsive to measurements of a first paper sensor 22 which senses the position of the leading edge of paper 40 (before inversion). An error of 1–2 mm in the position of the paper may be encountered and corrected by the servo motor using the following method:

After receiving paper 40, servo-controlled roller R2 changes its direction to clockwise, and changes its velocity to correct for any error in the position of paper 40, bringing the trailing edge of paper 40 exactly to a pick-up point of a roller R3, rotatable counterclockwise.

As roller R3 picks up the trailing edge of paper 40, the trailing edge becomes the new leading edge, and paper 40 is inverted. It is noted that the paper is still referenced to its original leading edge.

The next transfer, from roller R3, rotatable counterclockwise to a roller R4, rotatable clockwise, involves a second paper sensor 24 which determines the position of the new tailing edge (previous leading edge) of paper 40, close to the transfer point from R3, as it is transferred onto roller R4. Second paper sensor 24 may be situated on roller R4 or it may be adjacent to roller R4. From roller R4, the paper is transferred to impression roller 14. Exact synchronisation between the image on impression roller 14 and paper 40 cannot be performed when paper 40 reaches impression roller 14; in general, the image is already on ITM (or photoconductive drum) 17 to produce an image on the second side of paper 40 when it reaches impression roller 14 at a precise time and angular position of impression roller 14. Thus, any correction in synchronisation must be made to the position of paper 40 before it reaches impression roller 14.

In the following discussion, the term pulley, as used here, refers to a wheel, possibly with a grooved rim, in direct contact with the flexible strip, preferably, a timing belt, to drive it,or to be driven by it. The term tension pulley refers to a wheel, possibly with a grooved rim, in direct contact with the flexible strip, to keep the flexible strip under tension. Preferably, roller R4 and a roller R5 are in communication with each other through a flexible strip 26, wherein a driving pulley 28 is mounted on roller R5 and moving continuously with it at a constant rotation rate, and a driven pulley 32 is mounted on roller R4 and moving continuously with it at the same (or proportional) constant rotation rate as that of R5. As used herein, the generic term flexible strip means a smooth belt, or a timing belt, or a cable, or a bead cable, or an endless chain. The term pulley may mean a sprocket An axis 27 of flexible strip 26 is defined as the line connecting the centres of R4 and R5. A tension pulley 34 serves as a tension to flexible strip 26. (Tension pulley 34 is optional, and may be eliminated.) Alternatively, two or more tension pulleys 34 may be used.) Correctional mechanism 30 is associated with flexible strip 26 and roller R4. Note that correction mechanism 30 does not affect roller R5, the driver, since the motion of roller R5 is controlled by a driving mechanism (not shown), which is commonly driven by, or synchronously driven with impression rollers 14 and/or 12, at a constant rotation rate. Only driven pulley 32 of roller R4 is free to respond to corrections.

Preferably, correctional mechanism 30 comprises a correctional tension pulley 38, mounted on an shaft 46. Motion is provided by a stepper motor 42, which moves shaft 46 and correctional tension pulley 38 so that they travel up or down a specific amount. At an "equilibrium position", correctional tension pulley 38 presses against flexible strip 26 at a first point, downstream of roller R4, producing an indentation in the profile of flexible strip 26. A tension pulley 44 mounted on a spring-loaded device 45 in partial compression, presses against flexible strip 26 at a second point, upstream of roller R4, and produces a second indentation in the profile of flexible strip 26. Spring loaded device 45 may be a spring-loaded piston-cylinder device. Alternatively, another spring-loaded device may be used. Alternatively, another method of resiliently pressing tension pulley 44 against flexible strip 26 may be used.

Preferably, when second paper sensor 24 determines that a positional correction to paper 40 is required, the controller activates stepper motor 42 which drives shaft 46 and correctional tension pulley 38. Step angular displacement of roller R4 is provided as follows:

When shaft 46 moves up, pressing correctional tension pulley 38 deeper against flexible strip 26 at the first point, downstream of roller R4, a demand for slack at the first point is created. In response, spring-loaded device 45 on which tension pulley 44 is mounted, compresses, pulling tension pulley 44 away from flexible strip 26 and releasing the slack that is to needed downstream. Flexible strip 26 moves in a clockwise direction, producing a step angular displacement to roller R4 in the clockwise direction.

When shaft 46 drives correctional tension pulley 38 away from flexible strip 26, slack in flexible strip 26 is created at the first point, downstream of roller R4. Spring compression of spring-loaded device 45 is released somewhat; tension pulley 44 presses deeper against flexible is strip 26 at the second point, gathering the slack that was released downstream. Flexible strip 26 moves a step in a counterclockwise direction, producing a step angular displacement to roller R4 in the counterclockwise direction. Note that the pressure of spring-loaded tension pulley 44 on flexible strip 26 is such that pulley 38 is always in contact with flexible strip 26. Note also that the situation described may be reversed; pulley 38 my be spring loaded or otherwise resiliently pressed against flexible strip 26 and tension pulley 44 may be driven by shaft 46.

Figure 2:
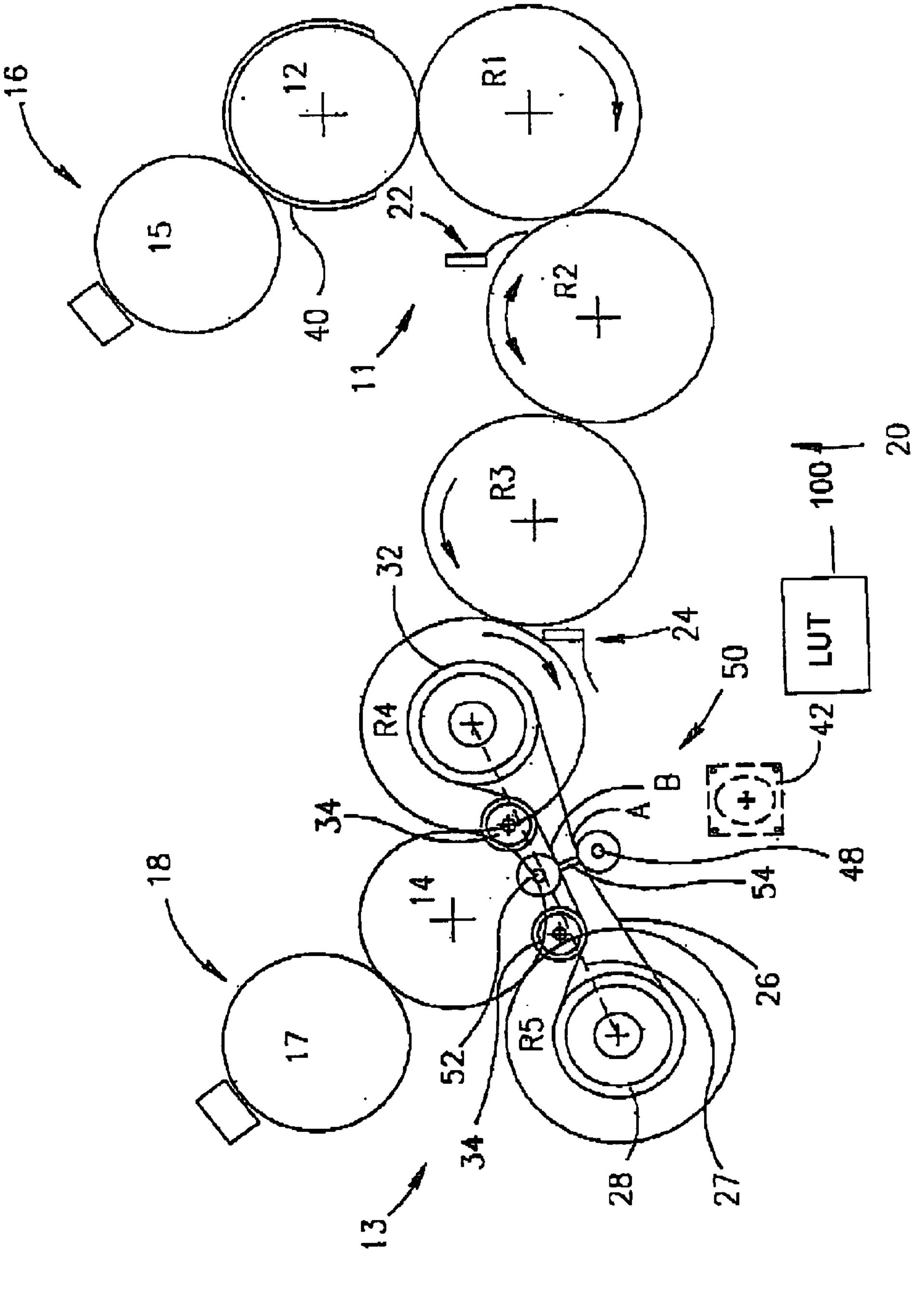
FIG. 2 is a schematic illustration of a tandem printer comprising another correctional mechanism for correcting a paper position, in accordance with another preferred embodiment of the invention.

Reference is now made to FIG. 2 which is a schematic illustration of a tandem printer 60 having a roller assembly 20 for paper inversion and transfer and another correctional mechanism 50, in accordance with another preferred embodiment of the invention.

In FIG. 2, the step linear displacement of flexible strip 26 is provided by two correctional tension pulleys 48 and 52, mounted on the two ends of a rod 54 and connected to a shaft (not shown) which is driven by stepper motor 42. Rod 54 is situated inside flexible strip 26, perpendicular to axis 27, with correctional tension pulleys 48 and 52 pressing against flexible strip 26 at two points, A and B, upstream and downstream of roller R4.

Preferably, step angular displacement of roller R4 is provided as follows:

When rod 54 moves up or down, one or the other of correction pulleys 48 or 52 is pressed deeper against flexible strip 26, requiring more slack, while the other is pulled away from flexible strip 26, releasing slack The transfer of slack provides the step displacement of flexible strip 26, in the direction of the increased indentation, producing a step angular displacement to roller R4 in that direction.

In some preferred embodiments of the invention, as shown, correctional tension pulleys 48 and 52 are external to flexible strip 26. Alternatively, they are internal to flexible strip 26. Note that pulleys 48 and 52 are always in contact with flexible strip 26. In some preferred embodiments of the invention, two tension pulleys 34 are used. Alternatively, only one tension pulley 34 is used. Alternatively still, no tension pulley is used.

The following discussion applies to the embodiments of both FIGS. 1 and 2.

Preferably, the step angular displacement of roller R4 is given as a function (which may be empirical) of the linear displacement. Alternatively, the step angular displacement of roller R4 is determined from a lookup table 100.

In some preferred embodiments, the section of the flexible strip adjacent to the first point and the section of the flexible strip adjacent to the second point are parallel.

For some configurations, small step angular displacements of roller R4 are symmetric for upward and downward displacements of tension pulleys 38 and 44 or tension pulleys 48 and; 52. More generally, they are not.

Preferably, there is only one sheet of paper on roller R4 at any time. Preferably, the total travel time of paper 40 on roller R4 is about 0.4–0.5 seconds, and the order of magnitude of the correction time by correctional mechanism 30 is 0.05–0.1 seconds. Preferably, the order of magnitude of the positional correction of paper 40 by correctional mechanism 30 is about 0.5 mm.

In some preferred embodiments, roller assembly 20 comprises more rollers or fewer rollers, depending on the distances between impression roller 12 and impressions roller 14.

In some preferred embodiments, a multi-printing system, comprising more than two printing engines, may be used, wherein a correctional mechanism such as correctional mechanism 30 or correctional mechanism 50 is positioned between any two adjacent printing engines.

In some preferred embodiments an eccentric shaft is used to convert the motion of stepper motor 42 to linear motion. Alternatively, any of a slider-crank mechanism, a piston-cylinder mechanism, or a turning-screw mechanism may be used. Alternatively still, any other method of providing linear motion, known to persons versed in kinematics, may be used.

In some preferred embodiments of the invention, as shown in FIGS. 1 and 2, the tandem printer comprises a duplex printer for printing on both sides of paper while inverting it Alternatively, the tandem printer comprises a multicolour printer of single side printing, with each colour being printed with a different one of the tandem series of printing engines. Where the tandem printer is a multicolour printer of single side printing, perfecting roller R2 and first paper sensor 22 are eliminated as the paper is not inverted. Alternatively, an additional roller (not shown) is provided and an operator may choose, preferably, with a keystroke at a control panel, whether to invert the paper, wherein the paper then passes through perfecting roller R2, or not to invert the paper, wherein the paper then passes through the additional roller.

In some preferred embodiments of the invention, the tandem printer comprises any conventional printer, such as a printer which prints directly from plates. Alternatively, the tandem printer comprises any of a lithographic printer, an electrostatic printer, or an electronic printer.

The present invention has been described using non-limiting detailed descriptions of preferred embodiments thereof that are provided by way of examples and are not intended to limit the scope of the invention. Variations of embodiments described will occur to persons of the art. Similarly, combinations of features of different embodiments within the scope of the claims will occur to persons of the art. These are still within the scope of the invention. The terms "comprise," include," and "have" or their conjugates, when used herein, mean "including but not necessarily limited to." The scope of the invention is limited only by the following claims:

What is claimed is:

1. A tandem printer with a mechanism for fine substrate-position correction, comprising:

a fit printing station;

a second printing station;

a transfer system which transfers the substrate from the first printing station to the second printing station, comprising:

a rotatable element, rotating at a given rotation rate, that receives the substrate after printing thereon by the first printing station and transfers the substrate toward the second printing station;

a sensor which measures the position of an edge of the substrate during its transfer from the first printing station to the second printing station;

a flexible strip, traveling at a given rate and providing motion to the rotatable element, wherein a corrective step displacement of the flexible strip induces a corrective step change in angular position of the rotatable element;

a controller, which applies a corrective step change in angular position of the rotatable element responsive to the measurements of the sensor, without changing the general rotation rate of the rotatable element via a step displacement of the flexible strip; and two pulleys, situated along the flexible strip; one upstream and one downstream of the rotatable element, said pulleys pressing into the flexible strip at a first point and a second point, respectively, wherein when pressure of one pulley is partially released, the other pulley takes up the thus produced slack, providing a corrective step displacement of the flexible strip.

2. A tandem printer according to claim 1 wherein the sensor which measures the position of an edge of the substrate is situated on the rotatable element.

3. A tandem printer according to claim 1 wherein the sensor which measure the position of an edge of the substrate is adjacent to the rotatable element.

4. A tandem printer according to claim 1 wherein the flexible strip rotates at a constant rate.

5. A tandem printer according to claim 1 wherein the flexible strip is a timing belt.

6. A tandem printer according to claim 1 and comprising:

a rod, comprising two points, to which the two pulleys are attached, one at each edge, wherein linear movement of the rod provides the motion of the pulleys into and away from the flexible strip.

7. A tandem printer according to claim 6 and including a motion provider for the rod, comprising:

an eccentric shaft to which the rod is attached; and a motor which provides motion to the eccentric shaft, wherein the motor is activated by the controller.

8. A tandem printer according to claim 6 and including a motion provider for the rod, comprising:

a slider-crank mechanism, wherein the rod is attached to the slider and moves in the same direction as the slider; and a motor which provides motion to the slider-crank mechanism, wherein the motor is activated by the controller.

9. A tandem printer according to claim 6 and including a motion provider for the rod, comprising:

a piston-cylinder mechanism, wherein the rod is attached to the piston and moves in the same direction as the piston; and a motor which provides motion to the piston-cylinder mechanism, wherein the motor is activated by the controller.

10. A tandem printer according to claim 6 and including a motion provider for the rod, comprising:

a tuning-screw mechanism, wherein the rod is attached to the screw and moves in the same direction as the screw; and a motor which provides motion to the turning-screw mechanism, wherein the motor is activated by the controller.

11. A tandem printer according to claim 1 and comprising:

a shaft on which one of the two pulleys is mounted pressing against the flexible strip at a first point; and a resilient device on which the other pulley is mounted, resiliently pressing against the flexible strip at a second point, wherein linear movement of the shaft provides motion of the pulley at the first point, and the response of the resilient device to release or demand in slack provides motion of the pulley at the second point.

12. A tandem printer according to claim 11, wherein the shaft is an eccentric shaft and including:

a motor which provides motion to the eccentric shaft, wherein the motor is activated by the controller.

13. A tandem printer according to claim 11 and including a motion provider for the shaft, comprising:

a slider-crank mechanism, wherein the shaft is connected to the slider and moves in the same direction as the slider; and a motor which provides motion to the slider-crank mechanism, wherein the motor is activated by the controller.

14. A tandem printer according to claim 11 and including a motion provider for the shaft, comprising:

a piston-cylinder mechanism, wherein the shaft is connected to the piston and moves in the same direction as the piston; and a motor which provides motion to the piston-cylinder mechanism, wherein the motor is activated by the controller.

15. A tandem printer according to claim 11 and including a motion provider for the shaft, comprising:

a turning-screw mechanism, wherein the shaft is connected to the screw and moves in the same direction as the screw; and a motor which provides motion to the turning-screw mechanism, wherein the motor is activated by the controller.

16. A tandem printer according to claim 1 wherein the two pulleys are substantially identical.

17. A tandem printer according to claim 1, wherein the section of the flexible strip adjacent to the first point and a section of the flexible strip adjacent to the second point are parallel to each other.

18. A tandem printer according to claim 1, wherein the tandem printer comprises a duplex printer for printing on both sides of the paper while inverting it.

19. A tandem printer according to claim 1, wherein the tandem printer comprises a multicolour printer of single-side printing, with each colour being printed with a different one of the tandem series of printing engines.

20. A tandem printer according to claim 1, wherein the tandem printer is a conventional printer which uses plates.

21. A tandem printer according to claim 1, wherein the tandem printer is an electrostatic printer.

22. A tandem printer according to claim 1, wherein the tandem printer is an electronic printer.

23. A tandem printer according to claim 1, wherein the tandem printer is a lithographic printer.

24. A method of applying a fine positional correction to a substrate on a tandem printer, comprising:

printing on a substrate by a first printing station;

transferring the substrate from the first printing station toward a second printing station, comprising:

mounting the substrate on a rotatable element of a substrate-transfer system; and moving the substrate by rotating the rotatable element at a given rotation rate;

measuring the angular position of an edge of the substrate on the rotatable element; and applying a step angular displacement to the rotatable element, responsive to the measurement, without changing the rotation rate of the rotatable element, wherein rotating the rotatable element at a given rotation rate comprises rotating the rotatable element by a flexible strip;

wherein applying the step angular displacement to the rotatable element comprises applying a step displacement to the flexible strip, comprising either a positive and negative step displacement to the flexible strip, thus inducing a clockwise and a counterclockwise step angular displacements to the rotatable element; and applying the positive step displacement to the flexible strip comprises:

releasing flexible strip slack upstream of the rotatable element; and taking up flexible strip slack downstream of the rotatable element; and wherein applying the negative step displacement to the flexible strip comprises:

releasing flexible strip slack downstream of the rotatable element; and taking up flexible strip slack upstream of the rotatable element.

25. A method according to claim 24 and including using a lookup table to calculate a necessary step displacement of the flexible strip in order to achieve a desired step angular displacement of the rotatable element.

26. A method according to claim 24 wherein the flexible strip is driven by a driving pulley, rotating at a constant rotation rate.

27. A method according to claim 24 wherein the flexible strip is a timing belt.

* * * * *

UNITED STATES PATENT AND TRADEMARK OFFICE

CERTIFICATE OF CORRECTION

PATENT NO. : 6,823,786 B1

DATED : November 30, 2004

INVENTOR(S) : Aron Shmaiser et al.

It is certified that error appears in the above-identified patent and that said Letters Patent is hereby corrected as shown below:

Title page,
Item [56], Reference Cited, OTHER PUBLICATIONS, "Canon Inc" reference, change "Mar. 22" to -- Mar. 27 --.

Column 10,
Line 7, replace "fit" with -- first --
Line 30, replace ";" with -- , --
Line 36, replace "a" with -- the --

Column 11,
Line 11, replace "tuning" with -- turning --
Line 18, after "mounted" insert -- , --

Signed and Sealed this

Seventeenth Day of May, 2005

JON W. DUDAS
*Director of the United States Patent and Trademark Office*